UNITED STATES PATENT OFFICE.

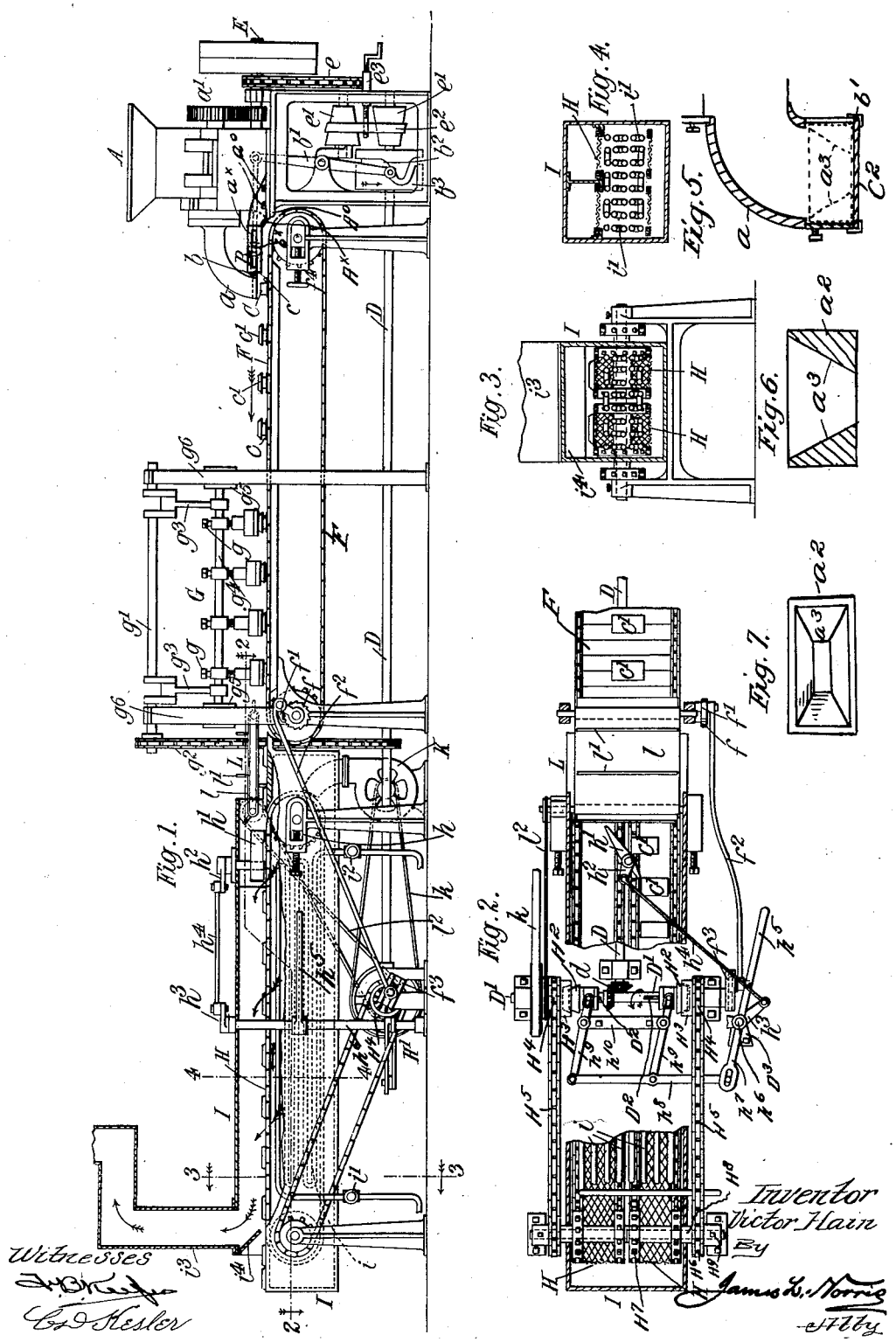

VICTOR HAIN, OF WEST KENSINGTON, LONDON, ENGLAND, ASSIGNOR OF ONE-HALF TO PEREGRINE OLIVER WILSON, OF LONDON, ENGLAND.

MANUFACTURE OF SWEETMEAT, SUCH AS CHOCOLATE.

No. 880,300.　　　　Specification of Letters Patent.　　　　Patented Feb. 25, 1908.

Application filed October 10, 1904. Serial No. 227,900.

*To all whom it may concern:*

Be it known that I, VICTOR HAIN, a subject of the King of Great Britain, residing at 7 Avonmore Gardens, West Kensington, in the county of London, England, chocolate expert, have invented certain new and useful Improvements Relating to the Manufacture of Sweetmeat, such as Chocolate, of which the following is a specification.

This invention relates to the manufacture of sweetmeat, such, for example as chocolate the object being to effect the operations of inclosing the sweetmeat in ordinary tin foil covering or other suitable wrapping, and shaping, molding and cooling the sweetmeat by mechanical means without contact with the hands of the operatives.

An essential feature of the invention consists in molding and wrapping the sweetmeat in its plastic state and effecting the cooling while the sweetmeat is confined in the wrapping and in the mold.

In order that the said invention may be clearly understood and readily carried into effect we will proceed to describe the same with reference to the accompanying drawings which illustrate by way of example, a machine adapted for accomplishing the objects in view.

Figure 1 is a view partly in elevation and partly in longitudinal section of a machine whereby the sweetmeat may be molded, wrapped and cooled without being subjected to handling by the operatives. Fig. 2 is a horizontal section taken along the line 2—2 in Fig. 1. Fig. 3 is a transverse section taken along the line 3—3 in Fig. 1. Fig. 4 is a transverse section taken along the line 4—4 in Fig. 1. Fig. 5 is a fragmental sectional view of the mouth piece; Fig. 6 is a sectional view of the insert; Fig. 7 is a plan view of the same.

The apparatus may comprise a shaping machine A adapted to deliver by means of interchangeable mouth pieces, or through a mouthpiece whereof the delivery may be adjustable, such as shown at $a$, in conjunction with a separating or severing device B, successive sections C of chocolate or other paste of predetermined dimensions; such sections being allowed to deposit upon sheets or leaves of tin-foil $c$, or other wrapping of appropriate size arranged in position for receiving the said sections of paste so that the latter lie squarely on the wrapping in the position assigned therefor.

The severing device B may comprise a horizontally reciprocating cutter such as $b$ operated by means of a lever $b'$ from a cam groove $b^2$ formed in a cam $b^3$ fast on the shaft D. Brackets $A^\times$ are bolted or secured at $a°$ to the table or support $A°$ of the shaping machine A. The trunnions $b^\times$ of the cutter $b$ slide in horizontal grooves or slots $a^\times$ provided in the brackets $A^\times$, as shown in Fig. 1. This shaft D is driven from the first motion shaft E by means of chain gearing $e$ and differential or coned pulleys $e'$ $e'$, the belt $e^2$ of the latter being rendered adjustable by means of the screw device $e^3$ thus enabling the speed at which the machine is driven to be varied. The shaping machine A is driven by the gear train $a'$. The mouth piece $a$ may be furnished with an insert $a^2$ having sloping inner sides $a^3$ and which is passed into the mouth piece $a$. The latter is formed with guides $b'$ so that a shutter or slide $c^2$ may be inserted for securing the insert $a^2$ in position in said mouth piece $a$. Said slide or shutter $c^2$ has a perforation coinciding with the orifice in the insert $a^2$.

The wrappings $c$ which form the under covering for the sweetmeat are preferably placed in defined positions by an attendant, upon an endless traveling platform or table F the face of the latter being composed of transversely disposed slats of partially vulcanized rubber or other suitable material or of material covered with rubber, springs being employed if desired to give the desired elasticity. The said platform is firmly supported, so as to offer the desired resistance whether the same be in motion or stationary. This platform or table is adapted to travel in such a manner as to remove, intermittently or at suitably regulated intervals, the shaped and severed sections C of sweetmeat delivered from the aforesaid mouthpiece $a$, in order to make room for the next leaf of wrapping and allow of the deposition of another section of paste thereon, in the position occupied by the previous one. Such intermittent traveling movement of the platform F is effected by means of a ratchet $f$ and pawl $f'$ operated by a rod $f^2$ from an eccentric $f^3$ on a transverse shaft D' this shaft D' being driven by bevel gearing $d$ from the shaft D. The leaves of wrapping $c$ with the paste sections C thereon, are carried by the platform F, of which the speed may be regulated, in front of another attendant, who places upon the top of each said section a leaf of wrapping which may have imparted thereto by means of a die or other device, the shape of a mold subsequently to be used; the said leaf of wrapping being also trimmed to the requisite dimensions if desired, in such a way, that its outer edge just touches the inside edges of the mold without overlapping or projecting beyond the same when placed therein. The upper wrapping leaf is not shown in the drawings but it is assumed to be residing in the mold $c'$ which, after the said upper wrapping leaf has been deposited upon the section is placed thereon, with its inside turned downwards upon the wrapping, so that the latter fits into the recess in the mold. The parts having been so disposed, the whole structure, comprising the section the wrapping leaves beneath and above the same (whereof the latter wrapping leaf may be shaped as hereinbefore described) and the inverted mold surmounting the same is carried upon the aforesaid intermittently traveling platform F beneath a succession of pressure imparting devices G such as elastic stamps, fitted preferably with a facing of partially vulcanized rubber, and so arranged as to descend upon the mold; such descent coinciding with the short intervals during which the platform is at rest. These successive stamps are capable of adjustment, by means of screws $g$ or other suitable devices, in order that the pressure exerted by them on the mold and the underlying substances may be of a very gentle character, the arrangement being such that each succeeding stamp presses the mold down a little deeper upon its contents. The said stamps G are operated by means of a crank shaft $g'$ which receives motion from the shaft D by chain gearing $g^2$; $g^3$ $g^3$ being connecting rods to a shaft $g^4$ common to all the stamps. The shaft $g^4$ is carried in slides $g^5$ $g^5$ which work in guides $g^6$ $g^6$. Under the graduated pressure the paste is pressed out between the wrapping leaves and assumes the form which the mold is required to impart; it being understood that the upper leaf and the upper surface of the sweatmeat receive the impression of the mold $c'$.

The last stamp, which exerts the final pressure on the mold, gently forces the latter on to the platform F, so as to firmly touch with its edges the bottom leaf of wrapping, causing it to finally inclose within itself the paste covered with the wrapping, the bottom leaf occupying the whole of the under side of the said paste. Both the bottom and top leaf of wrapping are thus brought into contact, the turned-down edges of the top leaf within the mold touching the bottom leaf, and thereby completely enveloping the paste.

The mold and the enveloped paste are then transferred to a traveling band H of suitable material, adapted to convey the same at a slow speed, through a cooling chamber I. The band H may be divided longitudinally as shown and provision be made, which may be of any suitable type, whereby the motion may be imparted either to one part or the other of the said band so that the passage of the wrapped chocolate through the said cooling chamber may be regulated so as to submit it to the cooling action for a longer or shorter period according to the condition or degree of plasticity of the sweetmeat.

The mechanism for controlling the movement of the two parts of the band H may consist of two friction clutches arranged on the shaft $D'$ and simultaneously operated by means of a hand lever $h^5$, mounted on a vertical rocking shaft $h^6$, an arm $h^7$, a link $h^8$, and levers $h^9$ fulcrumed upon a part $h^{10}$ secured to the frame. The cones $H^2$ of the clutches slide on the shaft $D'$ to which the said cone are keyed by feathers that slide in key ways $D^2$. Brackets $D^3$ carry the shaft $D'$ which carries the shell portions $H^3$ of the clutches. To the said shells $H^3$ are secured chain wheels $H^4$ around which pass the chains $H^5$ $H^5$ that transmit motion to the two parts of the band H through chain wheels $H^6$ $H^6$ and $H^7$ $H^7$ carried by the shaft $H^8$ mounted in brackets $H^9$ $H^9$ of the main frame. During the passage through this chamber the wrapped and molded sweetmeats are exposed to currents of air, which may be derived from a fan K driven from the transverse shaft $D'$ by means of the belt $k$. Or other cooling agents may be employed. The wrapped and cooled sweetmeat issues from the said chamber I in a hardened condition.

The chamber I is preferably provided with a coil of piping $i$ through which water or brine may be circulated with a view to regulating the temperature of the chamber according to the condition of the sweetmeat. $i'$ $i^2$ are cocks for respectively admitting and discharging the circulating medium. The bands are formed of perforated material so as to permit of the passage therethrough of the air forced into the chamber I; a flue $i^3$ being provided for the escape of the air. $i^4$ is a baffle for directing the air into the said flue. In order to facilitate the transference of the wrapped sweetmeat from the intermittently traveling platform F to the band or bands H we provide a pusher L which may consist of the band $l$ having transverse bars or projections $l'$ thereon. This band $l$ is driven by means of the chain gearing $l^2$ from the aforesaid transverse shaft $D'$.

The tension of the platform F may be rendered adjustable by means of the screw device shown at $f^4$ while the bands H may be similarly adjustable by means of the screw device $h$; the said devices comprising adjustable bearing blocks for the shafts carrying the drums whereby the platform or bands respectively are carried.

For directing the wrapped sweetmeat on to the one or the other of the traveling bands H H as may be considered necessary by the operator a plate $h'$ is provided, same being capable of an oscillatory motion by means of the hand lever $h^5$, rocking saft $h^6$, levers $h^2$ $h^3$ and a connecting rod $h^4$.

By employing the hereinbefore described means of cooling the expensive refrigerating appliances ordinarily employed may be dispensed with.

The cooled hardened and wrapped sweetmeat having passed from the chamber I, the mold is lifted off, there being no cohesion between it and the surface of the wrapping, the edges of the molded cake are trimmed so as to remove any superfluous wrapping, or paste, which may result from the action of the stamps; the sweetmeat being then finished for the market.

If no wrapping of the paste is desired, the mold is placed with its recess directly upon the paste without the application of the upper or intervening wrapping leaf, and after cooling the contents are emptied out.

What I claim and desire to secure by Letters Patent of the United States is:—

1. In a machine of the class described, a shaping device, a conveying mechanism, means for imparting pressure to the material, a cooling chamber and means for controlling the speed at which the conveying mechanism passes the material through said cooling chamber.

2. In a machine of the class described having conveying mechanism, a shaping device for discharging the material on to said mechanism, a cutter, a pressure imparting device, a cooling chamber, traveling bands in said chamber, a clutch device for alternately throwing said bands into action, means for transferring the material on to said bands, and means for cooling said chamber.

3. A machine of the class described having conveying mechanism, a shaping device, a plurality of pressure imparting devices movable in unison, a cooling chamber, separated endless bands in said chamber, means for controlling the movement of said bands, means for cooling said chamber, and means for imparting intermittent motion to the conveying mechanism.

4. In a machine of the class described, a traveling platform, a shaping device mounted above the same and adapted to supply material to said platform, pressure devices operable on said material, a cooling chamber, separated movable bands in said chamber, means for controlling the movement of said bands, and means for imparting motion to the platform.

5. In a machine for molding and wrapping chocolate or other sweetmeat in a plastic state, the combination of a shaping machine, an endless intermittently moving platform, pressure imparting devices, a pusher or conveyer for removing the paste from the pressure imparting device, a traveling divided band, a cooling or hardening chamber, and means for operating the bands at differential speeds, substantially as herein described.

6. In a machine for molding and wrapping chocolate or other sweetmeat in a plastic state, the combination of a shaping machine, a cutter, an intermittently traveling platform, a series of stamps or pressure imparting devices, a pusher, a cooling or hardening chamber, a differentially moving band in said cooling chamber, a fan for supplying air to said cooling chamber, and means for regulating the temperature of said chamber, substantially as herein described.

7. In a machine for molding and wrapping chocolate or other sweetmeat in a plastic state, the combination of a shaping machine, a cutter, an intermittently traveling platform, a series of stamps or pressure imparting devices, a pusher, a cooling or hardening chamber, differentially moving bands in said chamber, a fan for supplying air to said cooling chamber, a coil of piping in said chamber and means for operating or actuating the said several parts from the first motion shaft substantially as hereinbefore described for the purposes specified.

8. In a machine for molding and wrapping chocolate or other sweetmeat in a plastic state, the combination of a shaping machine, a cutter, an intermittently traveling platform, a series of stamps or pressure imparting devices, a pusher, a cooling or hardening chamber, differentially moving bands in said chamber, a fan for supplying air to said chamber, a coil of piping in said chamber, an oscillatory directing plate working over the said differentially moving bands and means for operating the said several parts from the first motion shaft substantially as hereinbefore described for the purposes specified.

9. In a machine for molding and wrapping chocolate or other sweetmeat in a plastic state, the combination of a shaping machine, a cutter, an intermittently traveling platform, a series of stamps or pressure imparting devices, a pusher, a cooling or hardening chamber, differentially moving bands in said chamber, a fan for supplying air to said chamber, a coil of piping in said chamber, an oscillatory directing plate working over the said differentially moving bands, and means for operating the said several parts at differential and regulated speeds from the first motion shaft substantially as hereinbefore described for the purposes specified.

10. In a machine for molding and wrapping chocolate or other sweetmeat in a plastic state, the combination of a shaping machine, a cutter an intermittently traveling platform, a series of stamps or pressure imparting devices, a pusher, a cooling or hardening chamber, differentially moving bands in said chamber, a fan for supplying air to said chamber, a coil of piping in said chamber, an oscillatory directing plate working over the said differentially moving bands, and means comprising coned pulleys for regulating the speed of working of the several parts substantially as herein described.

11. In a machine for molding and wrapping chocolate or other sweetmeat in a plastic state, the combination of a shaping machine, a cutter, an intermittently traveling platform, a series of stamps or pressure imparting devices, a pusher, a cooling or hardening chamber, differentially moving bands in said chamber, a fan for supplying air to said chamber, a coil of piping in said chamber, an oscillatory directing plate working over the said differentially moving bands, means for deflecting and conveying away the air used in the cooling or hardening chamber, means for driving the several parts from one shaft and means for driving the said shaft from the driver of the shaping machine, and for varying the speed thereof substantially as herein described for the purposes specified.

12. In a machine for molding and wrapping chocolate or other sweetmeat in a plastic state, the combination of a shaping machine, a cutter, an intermittently traveling platform, a series of stamps or pressure imparting devices, a pusher, a cooling or hardening chamber, differentially moving perforated bands in said chamber, a fan, an oscillatory directing plate, and means for operating the said several parts differentially and at regulated speeds substantially as herein described for the purposes specified.

In testimony whereof I have hereunto set my hand in presence of two subscribing witnesses this 17th day of September, 1904.

VICTOR HAIN.

Witnesses:
H. D. JAMESON,
R. F. WILLIAMS.